US006785105B2

(12) United States Patent
Roberts et al.

(10) Patent No.: US 6,785,105 B2
(45) Date of Patent: Aug. 31, 2004

(54) GROUND FAULT DETECTION SYSTEM FOR UNGROUNDED POWER SYSTEMS

(75) Inventors: Jeffrey B. Roberts, Viola, ID (US); David E. Whitehead, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 213 days.

(21) Appl. No.: 10/213,037

(22) Filed: Aug. 5, 2002

(65) Prior Publication Data

US 2004/0021995 A1 Feb. 5, 2004

(51) Int. Cl.[7] .................................................. H02H 3/26
(52) U.S. Cl. .............................. 361/76; 361/83; 361/42
(58) Field of Search ........................ 361/42–50, 62–69, 361/76, 78–83, 86, 87; 324/509, 512, 522, 521; 700/286, 292, 293, 294

(56) References Cited

U.S. PATENT DOCUMENTS

| | | | | |
|---|---|---|---|---|
| 4,996,624 A | * | 2/1991 | Schweitzer, III | ............. 361/63 |
| 5,446,387 A | * | 8/1995 | Eriksson et al. | ............. 324/522 |
| 5,694,281 A | * | 12/1997 | Roberts et al. | ............... 361/80 |
| 6,573,726 B1 | * | 6/2003 | Roberts et al. | ............. 324/509 |

* cited by examiner

Primary Examiner—Ronald Leja
(74) Attorney, Agent, or Firm—Cook, Alex, McFarron, Manzo, Cummings & Mehler, Ltd.

(57) ABSTRACT

The fault detection system includes at least one valid zero sequence voltage source, either from a local relay or a remote relay on a protected line. Zero sequence current is selected between total (vector sum from both ends of the protected line) measured zero sequence current or calculated zero sequence current. A zero sequence impedance-based calculation is then made and the result is compared against a threshold value to produce a trip decision. The trip decision is then applied through a normal tripping circuit or a slow tripping circuit, depending upon selected circuit conditions, involving the local and remote ends of the line.

11 Claims, 1 Drawing Sheet

GROUND FAULT DETECTION SYSTEM FOR UNGROUNDED POWER SYSTEMS

TECHNICAL FIELD

This invention relates generally to the detection of ground faults in ungrounded power systems, and more specifically concerns the use of zero sequence current from both ends of the line to achieve sufficient sensitivity so that ground faults can be detected in spite of the very small phase-ground fault current in ungrounded systems.

BACKGROUND OF THE INVENTION

Most power systems in the United States are grounded systems, either solidly or by a low, impedance connection. Grounded power systems are used to minimize voltage and thermal stresses on the power system, provide for personal safety, reduce communication system interference and promote rapid detection and elimination of ground faults because of large fault currents, which can be quickly identified. Grounded power systems do reduce overvoltage stresses on the system; the large fault current magnitudes, however, are a severe disadvantage. Phase-to-ground faults must be cleared immediately to avoid thermal stress on the system, wire-based communication channel interference and safety hazards for any individuals in the vicinity of the phase-to-ground fault. Accordingly, power service must be interrupted, in the event of phase-to-ground faults, even though the fault may be temporary, i.e. transient.

An alternative to grounded power systems is, of course, ungrounded systems, which are used in many foreign countries and many large industrial plants in the U.S. Ungrounded systems restrict the ground fault current and achieve most of the above power system goals, with the exception of the minimization of voltage stress. The disadvantage of an ungrounded system is that phase-to-ground faults produce only relatively small ground fault currents which are hard to detect and therefore create a sensitivity problem for those relays arranged to detect grounded system faults.

In ungrounded systems, the neutral has no intentional connection to ground and the system is connected to ground through the line-to-ground capacitances. Single line-to-ground faults shift the neutral system voltage, but leave the phase-to-phase voltage triangle intact. Accordingly, if all the loads are connected phase-to-phase, the loads do not suffer from a reduced voltage and can continue operation during single phase-to-ground faults, at least until a fault occurs on another phase.

For ungrounded systems, the major factors that limit the magnitude of ground fault current, which is normally used to detect ground faults, are the zero sequence line-to-ground impedance and the fault resistance. Zero sequence or three single phase voltage relays can detect ground faults in ungrounded systems; however, such an approach is not very popular because it is not selective, i.e. all the relays across a power system will measure virtually the same zero sequence voltage for a single phase-to-ground fault. With such systems, locating and isolating the fault requires sequential disconnection of the feeders in turn, and then determining that the zero sequence voltage has returned to its pre-fault value in order to identify the fault.

A sensitive directional ground varmetric element is a typical alternative to sequential disconnection of feeders. In these systems, zero sequence voltage and current are measured at the local relay location. A forward fault declaration from the directional elements, combined with a communications-assisted scheme of tripping logic, to create an assisted tripping scheme, produces trip decisions at relatively high speed when the relays at both ends determine the fault as being in the forward direction. However, when one relay on the line does not make a directional declaration due to insufficient current, the operating speed of the system slows significantly, which is a disadvantage in the ground fault detection system.

Accordingly, it would be desirable, using zero sequence impedance, to determine phase-to-ground faults both quickly and with high sensitivity.

SUMMARY OF THE INVENTION

Accordingly, the invention is a ground fault detection system for use in a local protective relay for ungrounded power systems, comprising: a selected one of (a) a zero sequence voltage value from a local relay on a protected power line and (b) a zero sequence voltage from a remote relay on the power line; total zero sequence current values from the local relay and from the remote relay; a circuit for calculating zero sequence impedance from the selected zero sequence voltage value and the total zero sequence current value; and a first tripping circuit for tripping a circuit breaker associated with the protected power line at a selected time interval following determination that the calculated zero impedance value exceeds a selected threshold, the first tripping circuit being subject to a second tripping circuit for tripping the circuit breaker at a time interval greater than the selected time interval when the calculated zero impedance exceeds a preselected value and when selected other circuit conditions exist.

BRIEF DESCRIPTION OF THE DRAWING

The figure is a logic diagram of the system of the present invention for determining ground fault conditions.

BEST MODE FOR CARRYING OUT THE INVENTION

Figure 1:
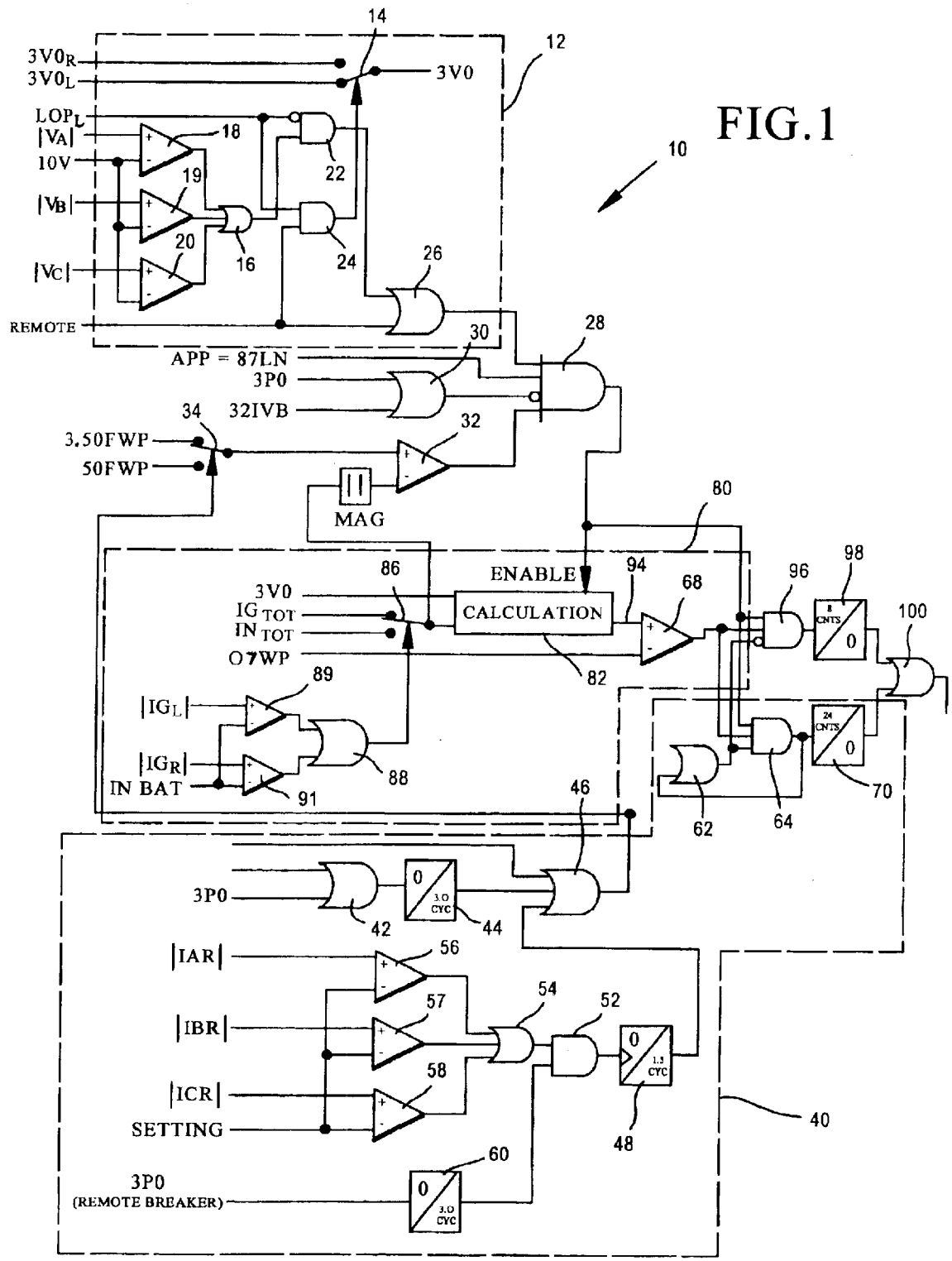

In the present invention, total line zero sequence current 3IO (the vector sum of all three local phase currents plus the vector sum of all three remote phase currents on the line) is used instead of the three local currents alone to calculate zero sequence current for the direction of ground faults in ungrounded systems. The locally measured zero sequence voltage is, however, typically the only voltage information which is required.

In the system of the present invention, the differential zero sequence circuit uses zero sequence local and remote currents and a zero sequence voltage value from either the local or remote relay to detect and clear phase-to-ground faults. As indicated above, an ungrounded power system produces very little phase-to-ground fault current. The system of FIG. 1 is capable of measuring and isolating one-milliamp phase-to-ground faults using the differential zero sequence circuit described herein.

If the power system incorporates a high impedance design, the magnitude of single line-to-ground fault current will be higher, and the various threshold values of the current and current adjustment angle can be adjusted accordingly in software settings in order to maintain sensitivity.

The circuit logic diagram for the phase-to-ground fault protection for ungrounded systems is shown in the figure, and referred to generally at 10. In the circuit, it is important that all analog quantities used as inputs to the circuit be time aligned. For instance, when the zero sequence voltage ($3VO_L$) calculated by the local relay is not useful, for whatever reason, and the circuit of FIG. 1 is enabled to use the remote zero sequence voltage ($3VO_R$) calculated by the remote relay, the relay must use the time aligned $3VO_R$ values. The term 3VO in the figure refers to the zero sequence voltage selected by the selection logic.

Referring to the figure, the portion of the circuit 10 shown at block 12 basically determines whether or not the local zero sequence voltage meets certain minimum threshold requirements, and whether other threshold conditions are satisfied for operation of the circuit. Zero sequence voltage is calculated at the local relay from the measured phase local voltage inputs, i.e. $V_A$, $V_B$ and $V_C$. The 3VO switch 14 switches between the local zero sequence voltage source ($3VO_L$) and the remote zero sequence voltage source ($3VO_R$). For ungrounded systems, as indicated above, the magnitude of zero sequence current during single line-to-ground faults is quite small. The zero sequence voltage differences at various locations in the power system are hence also very small, compared with solidly grounded power systems, where the zero sequence voltage varies significantly throughout the system because of the very large zero sequence current magnitudes. The ability of the circuit to switch between local and remote sources of zero sequence voltage is helpful, particularly in the following situations.

First, if the local relay experiences a blown fuse, the relay can switch to the remote zero sequence voltage source without harming the functionality of the relay; and second, if one end of the line is not connected to any voltage transformers, because none were installed.

OR gate 16 is responsive to the outputs of three comparators 18, 19 and 20. Each comparator checks the magnitude of one of the phase voltages ($V_A$, $V_B$, $V_C$) from the voltage transformer secondaries against a 10-volt threshold. The purpose of this portion of the circuit is to insure that at least one phase voltage input to the circuit is actually connected to a voltage source. The 10-volt threshold is above the level of any induced voltage from a parallel line, yet below a normal operating voltage. Hence, the output of OR gate 16, if it is high, indicates that at least one voltage phase is in fact connected to a voltage source.

The output of OR gate 16 is applied as one input to an AND gate 22. The other input to AND gate 22 is a local loss-of-potential (LOP) signal, which is applied to a NOT input of AND gate 22. The output of AND gate 22 is high if the local relay does not sense a loss of potential condition and at least one local phase voltage is greater than 10 volts (secondary). Otherwise, the output of AND gate 22 is low. The high output from AND 22 indicates the above threshold conditions have been satisfied.

The local LOP signal is applied as one input to AND gate 24. The other input to AND gate 24 is a signal from the remote relay (from the other end of the line), indicating that the remote signal is valid, i.e. that there is no loss-of-potential (LOP) at the remote relay and at least one phase voltage at the remote relay is greater than 10 volts secondary. The output of AND gate 24 controls the position of switch 14. If the output of AND gate 24 is high (there is a local loss-of-potential), the relay uses the $3VO_R$ signal, as discussed below. Otherwise, the relay uses the $3VO_L$ signal.

The output of AND gate 22 is applied as one input to OR gate 26. The other input to OR gate 26 is the remote signal valid indication which was applied to AND gate 24. The output of OR gate 26 is applied as one input to AND gate 28. The output of AND gate 28 controls the enabling of the circuit of the figure, in particular, the zero sequence impedance calculation, which in some cases can be adjusted according to the angle of the source, for particular applications. The calculation is explained in more detail below. If neither input to OR gate 26 is high, then the system does not have a valid source of zero sequence voltage and the circuit of FIG. 1 is blocked, since the output of AND gate 28 will be low.

A second input to AND gate 28 is a circuit-enable switch 29 which is operated by the user if the circuit is to be used. A third input to AND gate 28, at a NOT input, is the output of OR gate 30. One input to AND gate 30 is a three pole open (3PO) signal. The other input is a control equation input, which can be used by the operator to establish other selected conditions for blocking the operation of the circuit. The output of OR gate 30 is high (blocking the circuit) during and for a short time following an open breaker condition or for the selected user-programmed conditions. The circuit must be blocked for a short time following the closure of the breaker in order to prevent the effect of any transient conditions which may occur during that time.

The other input to AND gate 28 is the output of a comparator 32. One input to comparator 32 is the output of a switch 34, which switches between a normal minimal current threshold value and an increased value which is used when an associated circuit breaker on the protected line closes. The switch 34 is actually controlled by another portion of the circuit, explained below. The minimum current value is set by the operator. The increased value is, in the embodiment shown, three times the minimum value, although this can be changed.

The threshold minimum current value from switch 34 is compared against a zero sequence current magnitude, either $IG_{tot}$ or $IN_{tot}$. $IG_{tot}$ is the total calculated zero sequence current (phasor):

$$IG_{tot}=IG_L \cdot (CTR/CTR_{max})+IG_R \cdot (CTR \text{ remote}/CTR_{max})$$

While $IN_{tot}$ equals total measured zero sequence current (phasor):

$$IN_{tot}=IN_L \cdot (CTR/CTR_{max})+IN_R \cdot (CTR \text{ remote}/CTR_{max})$$

The purpose of the output of comparator 32 is to establish whether or not the current value exceeds a minimum current threshold. A high output from comparator 32 indicates that the minimum value has been exceeded. This signal is applied to AND gate 28.

The output of AND gate 28 is an enable signal for the circuit. If the outputs from OR gate 26 and comparator 32 are both high, and the output of OR gate 30 is low, and the circuit has been enabled by the user, then the output of AND gate 28 is high and the circuit is enabled for operation.

Block 80 is a calculation circuit which accomplishes a zero sequence impedance calculation, which as indicated above may be adjusted according to the angle of the source, depending upon a particular application. One input to the calculation circuit 82 is the 3VO signal from switch 14 on line 84. The other input is the current input, either $IG_{tot}$, which is the total calculated zero sequence current, or $IN_{tot}$, which is the total measured zero sequence current, as discussed in detail above. The selection between the two currents is accomplished by switch 86, which is controlled by the output of OR gate 88, and switches between $IN_{tot}$ (normal operation) or $IG_{tot}$. If either the local or remote calculated zero sequence current magnitudes exceed a selected threshold, the system uses $IG_{tot}$ instead of $IN_{tot}$ in the calculations. The switch 86 permits a broad current range, from one milliamp to 160 $A_{RMS}$. For accuracy at the lower current levels, the relay uses the vector sum of the IN (measured) currents from each line end. This input has a range of one milliamp to approximately 2.5 $A_{RMS}$.

OR gate 88 is responsive to the outputs of two comparators 89 and 91. Comparator 89 compares the local calculated zero sequence current ($IG_L=I_{AL}+I_{BL}+I_{CL}$) against a threshold value while comparator 91 compares the remote calculated zero sequence current ($IG_R=I_{AR}+I_{BR}+I_{CR}$) against the same threshold. A high output from either comparator results in the switch being connected to the $IG_{tot}$ value. Typically, the power system zero-sequence or summing or core-flux current transformer (CT) feeding the relay has a much smaller ratio than that of the phase current transformers, e.g. 1:1 versus 600:1. For very small ground fault currents, the lower ratio zero sequence or core flux summing CT presents the IN relay input with larger, more reliable current values. If the calculated zero sequence current to either relay IN input exceeds 2.5 amps, then this channel will digitally saturate where the magnitude will go no higher than the 2.5 amps and the phase angle information will be corrupted. In ungrounded systems, the magnitude of fault current is controlled by the amount of system capacitance and the fault resistance. Hence, for high impedance faults and for systems with very few feeder lines, the magnitude of the ground fault current is small.

The same relay must be applicable to the same system if the user adds more feeders, however. Adding more feeders can be as simple as closing a bus tie breaker to an adjoining ungrounded feeder distribution feeder system. In such a case, the available fault current can exceed the saturation threshold of the IN channel and CT. For such situations, however, the sensitive IN channel is no longer needed and the relay can rely upon the current delivered by the phase CTs.

An impedance-based calculation, in some cases adjusted by the angle of the source, is then performed using the 3VO voltage and the selected current value. The calculation formula in the embodiment shown is:

$$S_{Z0} = \frac{R_e[3V_0 \cdot (I_{zero-sequence} \cdot 1\angle 90°)^*]}{|I_{zero-sequence}|^2}$$

The 3VO value comes from the output of switch 14 and the zero sequence current value comes from the position of switch 86. The zero sequence impedance output from the calculation circuit is applied as one input to comparator 68. The other input to comparator 68 is a user established threshold value which can be automatically set or custom-set by the user.

The output of comparator 68 is high if the zero sequence impedance from calculation circuit 82 is larger than the threshold value which is applied on input line 94. The output of comparator 68 is applied to AND gate 96. One of the other inputs to AND gate 96 is the circuit enable signal from AND gate 28, indicating that there are voltages available and that the voltages are at an appropriate level, as well as other conditions satisfied. The other input to AND gate 96 is a NOT input from an OR gate 62, which is a slower speed trip signal from the circuit explained below. If the output from OR gate 62 is high, the slower trip circuit controls the outcome of the circuit; if it is low, and the outputs from comparator 68 and the AND gate 28 are both high, the input of AND gate 96 will be high, which is applied to a timer 98. Timer 98 is a time-delayed pickup, instantaneous dropout timer. In the embodiment shown, the input to timer 98 must be high for eight consecutive ¹⁄₁₆th cycle processing intervals. If that occurs, a high output results. This is the key result of the circuit. The high output is applied to output OR gate 100, the output of which is the trip signal for the circuit breaker. For a trip signal to occur through this part of the circuit, the calculator circuit must be enabled, the zero sequence impedance value must be greater than the set threshold, no recent breaker closures detected, and the relay is not working in the desensitized, i.e. slow trip mode.

Block 40 shows another portion of the ground fault detection circuit of the present invention, specifically that portion of the circuit which increases the pickup settings of the circuit under particular conditions and for slowing (delaying) a possible trip signal. OR gate 42 receives two inputs, one being a positive sequence input and the other a three pole open input. The positive sequence input is a signal which indicates that a positive sequence negative slope disturbance has been detected. This, for instance, could be the output of a logic circuit which detects fast circuit breaker openings in order to manage filter transients at the start of faults under heavy load flow conditions. The output of OR gate 42 initiates a timer 44, which in the embodiment shown is an instantaneous pickup, time-delay dropout timer. The dropout time of timer 44 in this embodiment is three cycles, but this could be changed, depending upon the particular application. The purpose of timer 44 is to provide time for the power system and the digital filter to stabilize in operation. The output of timer 44 is applied as one input to an OR gate 46.

Another input to OR gate 46 is from OR gate 26, indicating that the zero sequence voltage value is greater than the threshold value. A third input to OR gate 46 is the output of timer 48. Timer 48 is an edge-triggered input, time-delayed dropout timer having, in the embodiment shown, a dropout time of 1.5 cycles. Timer 48 is initiated by the output of AND gate 52. One of the inputs to AND gate 52 is the output of OR gate 54. OR gate 54 is responsive to the outputs of comparators 56–58. Comparators 56–58 compare the magnitude of the phase currents ($I_A$, $I_B$, $I_C$) received from the remote relay against a threshold value which has been adjusted by the ratio of the remote current transformers to the maximum set phase CT ratio. Using this adjustment gives both ends of the line the same sensitivity, even though they may have different CT turns ratios. If any of these remote current values is greater than the threshold, the remote circuit breaker is considered to be closed.

The other input to AND gate 52 is the output of a timer 60. Timer 60 is an instantaneous pickup, time-delayed dropout timer, with a three-cycle dropout time, which may be varied. The single input to the timer is the status of the remote (three pole open) 3PO indication. If the remote breaker is open, the 3PO signal is high and effectively remains so for the dropout time value set in the timer. This additional delay compensates for the user setting an inappropriately short delay time and also to address the situation where a short 3PO value is appropriate for other functions. A high output from timer 60 simply indicates that the remote breaker has been closed.

The output of OR gate 46 is applied at one input to OR gate 62, the output of which is applied to an AND gate 64 and to an inverted input of AND gate 96, which inhibits the normal trip signal current. The other inputs to AND gate 64 are the output of AND gate 28 and the output of comparator 68, which, as discussed above, is the result of the zero sequence impedance calculation part of the circuit. The output of AND gate 64 is also applied as one input to a time-delayed pickup (24 ¹⁄₁₆th cycles), instantaneous dropout timer 70. The input to timer 70 thus must be a logical one for 24 consecutive 1/16th processing interval cycles before the output of timer 70 goes high. This circuit basically is used to delay a tripping signal. The output of timer 70 is a "slow" trip signal applied to output OR gate 100. Hence, when the slow trip portion of the circuit is high, a trip signal will be delayed relative to the normal time, to provide an opportunity to the circuit to clear in the interim.

Hence, a ground fault determination circuit has been disclosed which is particularly useful for ungrounded power systems. It uses a zero sequence impedance calculation, responsive to a zero sequence voltage from either the remote or the local relay, and a zero sequence current. The zero sequence impedance value is compared against a preset threshold value to make a trip determination. The circuit also has a desensitized, slow trip mode, which operates upon the occurrence of selected current/input conditions.

Although a preferred embodiment of the invention has been described for purposes of illustration, it should be understood that various changes, modification and substitutions may be made to the embodiment without departing from the spirit of the invention, which is defined in the claims which follow.

What is claimed:

1. A ground fault detection system for use in a local protective relay for ungrounded power systems, comprising:

a selected one of (a) a zero sequence voltage value from a local relay on a protected power line and (b) a zero sequence voltage value from a remote relay on the power line;

total zero sequence current values from the local relay and from the remote relay;

a circuit for calculating zero sequence impedance from the selected zero sequence voltage value and the total zero sequence current value; and a first tripping circuit for tripping a circuit breaker associated with the protected power line at a selected time interval following determination that the calculated zero sequence impedance value exceeds a selected threshold, the first tripping circuit being subject to a second tripping circuit for tripping the circuit breaker at a time interval greater than the selected time interval when the calculated zero sequence impedance exceeds a preselected value and when selected other circuit conditions exist.

2. A system of claim 1, wherein the local zero sequence voltage is used if a local loss-of-potential signal does not occur, and there is at least one valid local voltage phase which is above a threshold value.

3. A system of claim 2, wherein the threshold value is 10 volts.

4. A system of claim 1, wherein if the remote zero sequence voltage is valid, and the local relay has a loss-of-potential, the remote zero sequence voltage signals are used.

5. A system of claim 1, including a control element permitting the user to use the ground fault detection system circuit or not.

6. A system of claim 1, wherein the calculation circuit is prevented from operation if there is a three pole open condition at the local relay.

7. A system of claim 1, wherein the first tripping circuit is blocked if a positive sequence negative slope disturbance has been detected and remains for a selected period of time.

8. A system of claim 1, wherein the second tripping circuit is used if the any of the remote phase currents exceed a selected threshold and the remote relay breaker is closed.

9. A system of claim 1, wherein the calculating circuit is not enabled unless the values of the selected zero sequence current exceeds a threshold value.

10. A system of claim 1, wherein the total zero sequence current value is the total of measured zero sequence current from the local and the remote relays, unless either the local or remote calculated zero sequence current values exceed a preselected threshold, in which case, the total zero sequence current value is the total calculated zero sequence current for the local and remote relays.

11. A system of claim 1, wherein the selected time interval is 8 consecutive 1/16th cycle intervals and the other time interval is 24 consecutive 1/16th cycle intervals.

* * * * *